(12) United States Patent
Jiang et al.

(10) Patent No.: US 10,763,997 B2
(45) Date of Patent: Sep. 1, 2020

(54) ACTION FRAME TO INDICATE CHANGE IN BLOCK ACKNOWLEDGMENT PROCEDURE

(71) Applicant: Marvell World Trade Ltd., St. Michael (BB)

(72) Inventors: Jinjing Jiang, San Jose, CA (US); Liwen Chu, San Ramon, CA (US); Yi-Ling Chao, Sunnyvale, CA (US); Hongyuan Zhang, Fremont, CA (US); Hui-Ling Lou, Sunnyvale, CA (US)

(73) Assignee: Marvell Asia Pte., Ltd., Singapore (SG)

( * ) Notice: Subject to any disclaimer, the term of this patent is extended or adjusted under 35 U.S.C. 154(b) by 119 days.

(21) Appl. No.: 16/050,674

(22) Filed: Jul. 31, 2018

(65) Prior Publication Data

US 2019/0288798 A1  Sep. 19, 2019

Related U.S. Application Data

(60) Provisional application No. 62/643,571, filed on Mar. 15, 2018.

(51) Int. Cl.
| | |
|---|---|
| *H04L 1/16* | (2006.01) |
| *H04L 29/08* | (2006.01) |
| *H04W 76/19* | (2018.01) |
| *H04L 29/06* | (2006.01) |
| *H04L 1/18* | (2006.01) |
| *H04W 4/80* | (2018.01) |
| *H04W 84/12* | (2009.01) |

(52) U.S. Cl.
CPC .......... *H04L 1/1621* (2013.01); *H04L 1/1628* (2013.01); *H04L 1/1635* (2013.01); *H04L 1/1664* (2013.01); *H04L 1/1896* (2013.01); *H04L 69/22* (2013.01); *H04L 69/324* (2013.01); *H04W 76/19* (2018.02); *H04W 4/80* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 9,226,102 B1 | 12/2015 | Singh et al. | |
| 9,503,245 B1 | 11/2016 | Choi et al. | |
| 2006/0034247 A1* | 2/2006 | Gu | H04L 1/1628 |
| | | | 370/349 |

(Continued)

OTHER PUBLICATIONS

International Search Report and Written Opinion in International Patent Application No. PCT/US2018/044638, dated Dec. 10, 2018 (13 pages).

(Continued)

*Primary Examiner* — Ayaz R Sheikh
*Assistant Examiner* — Tarell A Hampton

(57) ABSTRACT

A first communication device generates a media access control (MAC) frame that includes an indication of a change in a block acknowledgment (BA) session that was previously established between the first communication device and a second communication device. The first communication device transmits the MAC frame to the second communication device. The MAC frame is configured to cause the second communication device to adopt the change in the BA session in response to receiving the MAC frame.

16 Claims, 8 Drawing Sheets

(56) References Cited

U.S. PATENT DOCUMENTS

| | | | |
|---|---|---|---|
| 2009/0067396 A1 | 3/2009 | Fischer | |
| 2011/0065440 A1* | 3/2011 | Kakani | H04L 1/0022 |
| | | | 455/450 |
| 2015/0092697 A1* | 4/2015 | Yeow | H04L 1/0025 |
| | | | 370/329 |
| 2015/0131541 A1* | 5/2015 | Prajapati | H04W 88/06 |
| | | | 370/329 |
| 2015/0282005 A1* | 10/2015 | Du | H04L 45/245 |
| | | | 370/394 |
| 2015/0373575 A1* | 12/2015 | Smadi | H04W 28/0215 |
| | | | 370/236 |
| 2016/0302229 A1* | 10/2016 | Hedayat | H04L 12/1868 |
| 2017/0055300 A1* | 2/2017 | Pitchaiah | H04L 1/1621 |
| 2018/0026752 A1* | 1/2018 | Andonieh | H04L 1/1614 |
| | | | 370/338 |
| 2018/0337753 A1* | 11/2018 | Yao | H04L 1/08 |
| 2019/0124055 A1* | 4/2019 | Guo | H04L 63/0471 |
| 2020/0021400 A1* | 1/2020 | Cherian | H04L 1/1887 |

OTHER PUBLICATIONS

IEEE Std 802.11-REVmc™ /D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE P802.11ax™ /D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

* cited by examiner

ACTION FRAME TO INDICATE CHANGE IN BLOCK ACKNOWLEDGMENT PROCEDURE

CROSS REFERENCES TO RELATED APPLICATIONS

This application claims the benefit of U.S. Provisional Patent Application No. 62/643,571, entitled "Enhancement to Block ACK (BA) Session Management," filed on Mar. 15, 2018, which is hereby expressly incorporated herein by reference in its entirety.

FIELD OF TECHNOLOGY

The present disclosure relates generally to wireless communication systems and, more particularly, to wireless communication devices that communicate using multiple wireless communication technologies.

BACKGROUND

Wireless communication networks continue to increase in demand as consumers flock toward mobile computing devices and as manufacturers continue to develop wireless devices with greater capabilities and features. Numerous types of wireless networks and network protocols exist. For example, wireless local area networks (WLAN) typically operate according to an Electronics Engineers (IEEE) 802.11 standard wireless communication protocol, first promulgated in 1999. These protocols include IEEE 802.11a, 802.11b, 802.11g, 802.11n, and 802.11ac, which operate at different spectrum bands and/or different multiplexing or spread spectrum schemes to deliver various bit rates to devices on a wireless network. Any of these IEEE 802.11 networks are often referred to as WiFi networks. Another wireless communication protocol is the Bluetooth protocol, which is commonly used in an ad-hoc network topology configuration for peer-to-peer communication between devices, such as between a cellular handset phone and a wireless earpiece headset. As yet another example, near field communication (NFC) protocols are for peer to peer communication between two devices in near proximity to each other.

SUMMARY

In an embodiment, a method includes: generating, at a first communication device, a media access control (MAC) frame that includes an indication of a change in a block acknowledgment (BA) session that was previously established between the first communication device and a second communication device; and transmitting, by the first communication device, the MAC frame to the second communication device, wherein the MAC frame is configured to cause the second communication device to adopt the change in the BA session in response to receiving the MAC frame.

In another embodiment, an apparatus comprises: a network interface device associated with a first communication device, wherein the network interface device includes one or more integrated circuit (IC) devices configured to: generate a media access control (MAC) frame that includes an indication of a change in a block acknowledgment (BA) session that was previously established between the first communication device and a second communication device, and transmit the MAC frame to the second communication device, wherein the MAC frame is configured to cause the second communication device to adopt the change in the BA session in response to receiving the MAC frame.

In still another embodiment, a method includes: after an aggregate media access control (MAC) protocol data unit (A-MPDU) has been transmitted during a block acknowledgment (BA) session between a first communication device and a second communication device, and after a BA frame has been transmitted during the BA session, wherein the BA frame includes acknowledgement information regarding one or more of the MAC frames included in the A-MPDU, receiving, at the first communication device, a MAC frame from the second communication device, wherein the MAC frame includes an indication of a change in the BA session; and in response to receiving the MAC frame, adopting, at the first communication device, the change in the BA session.

In yet another embodiment, an apparatus comprises: a network interface device associated with a first communication device, wherein the network interface device includes one or more integrated circuits(IC) devices configured to: after an aggregate media access control (MAC) protocol data unit (A-MPDU) has been transmitted during a block acknowledgment (BA) session between the first communication device and a second communication device, and after a BA frame has been transmitted during the BA session, wherein the BA frame includes acknowledgement information regarding one or more of the MAC frames included in the A-MPDU, receive a MAC frame from the second communication device, wherein the MAC frame includes an indication of a change in the BA session, and in response to receiving the MAC frame, adopt the change in the BA session.

DETAILED DESCRIPTION

Figure 1:
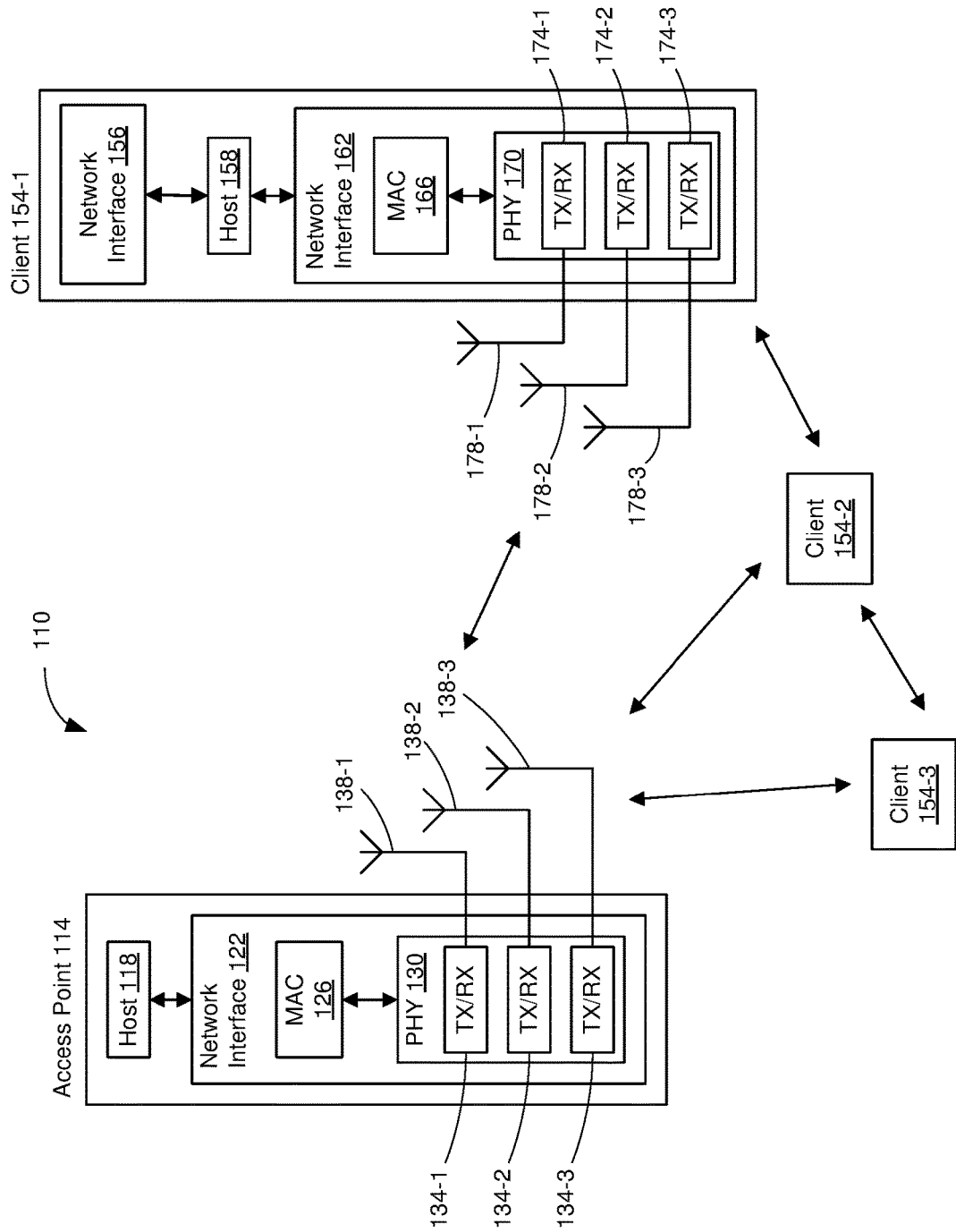
FIG. 1 is a block diagram of an example wireless local area network (WLAN), according to an embodiment.

Wireless communication devices often employ multiple communication technologies that co-exist in the communication devices. For example, a communication device may operate according to a Bluetooth protocol, and may also operate in a WLAN network according to a WLAN communication protocol, such as the IEEE 802.11n Standard or the IEEE 802.11ac Standard. In some situations, concurrent operation of multiple systems operating according to different communication protocols within a device can cause interference between the multiple systems. For example, when a communication device includes both WLAN and Bluetooth communication systems, which have overlapping frequencies, the transmissions of one system may interrupt, degrade, or otherwise interfere with reception by the other system. To avoid interfering with one another, the WLAN and Bluetooth communication systems may cooperate by time-sharing the communication channel. For example, one communication system, such as Bluetooth, may be given priority to use the communication channel during periodic time slots. During such time slots designated for Bluetooth, the WLAN communication system is supposed to go quiet to avoid interfering with the Bluetooth communications.

In some situations, a wireless network device such as an access point (AP) of a WLAN may be transmitting data to a client station that is time-sharing its communication channel between its WLAN communication system and, for example, a Bluetooth communication system. However, the AP may be unaware that the client station is time-sharing its communication channel. Accordingly, in embodiments described herein, a client station sends signals to an AP to indicate to the AP that the client station will be unavailable in the near future so that the AP will not attempt to transmit to the client station (sometimes referred to as "flow control"). In an embodiment, the client station sends a signal to the AP so that the AP will stop transmitting data to the client station shortly before the next designated time slot for Bluetooth begins. In an embodiment, the client station sends a signal to the AP to indicate to the AP to stop sending aggregate data units, such as aggregate media access control (MAC) protocol data units (A-MPDUs). In an embodiment, the client station sends a signal to the AP to indicate to the AP to resume transmitting to the client station or to resume transmitting A-MPDUs to the client station.

In some embodiments, an action frame permits the client station to change one or more block acknowledgment (BA) session parameters without having to end the BA session altogether. For example, the client station transmits the action frame to the AP shortly before the next designated time slot for Bluetooth begins, where the action frame instructs the AP to one or more of i) stop transmitting A-MPDUs to the client station, ii) reduce the maximum allowed duration of A-MPDUs that the AP can transmit to the client station, iii) stop sending data to the client station, etc., according to various embodiments. After the Bluetooth time slot ends, the client station transmits another action frame to the AP that instructs the AP to one or more of i) resume transmitting A-MPDUs to the client station, ii) increase the maximum allowed duration of A-MPDUs that the AP can transmit to the client station back to a previous value, iii) resume sending data to the client station, etc., according to various embodiments. Efficiency is improved by such action frames because the client station can, during a BA session, prompt the AP to stop sending A-MPDUs, for example, shortly before a Bluetooth time slot, and then prompt the AP to resume sending A-MPDUs, for example, after the Bluetooth time slot, without having to end the BA session entirely.

FIG. 1 is a block diagram of an example wireless local area network (WLAN) 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Network interface 156 has a similar structure as network interface 162, with a corresponding MAC unit, PHY unit, one or more transceivers and one or more antennas. In some embodiments, one or more antennas are shared by network interface 156 and network interface 162. In some embodiments, network interface 156 and network interface 162 correspond to different radio access technologies. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
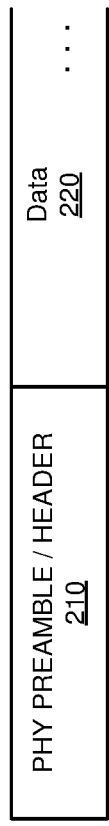
FIG. 2A is a block diagram of an example physical layer (PHY) data unit, according an embodiment.

FIG. 2A is a diagram of a PHY data unit 200 that the AP 114 is configured to transmit to one or more client stations 154 (e.g., the client stations 154-1, 154-2, etc.), according to an embodiment. In an embodiment, one or more client stations 154 (e.g., the client stations 154-1, 154-2, etc.) are also configured to transmit data units the same as or similar to the data unit 200 to the AP 114. The data unit 200 conforms to a first communication protocol and occupies a 2.16 GHz bandwidth. Data units similar to the data unit 200 occupy other suitable bandwidth such as 4.32 GHz, 6.48 GHz, 8.64 GHz, 10.8 GHz, 12.96 GHz, for example, or other suitable bandwidths, in other embodiments. The data unit 200 includes a PHY preamble/header 210 and a data portion 220. The preamble/header 210 includes one or more training fields generally used for synchronization and channel estimation, in an embodiment. The preamble/header 210 additionally includes one or more signal fields used to indicate various parameters needed at a receiving communication device to properly decode the data portion 220, in an embodiment.

Figure 2B:
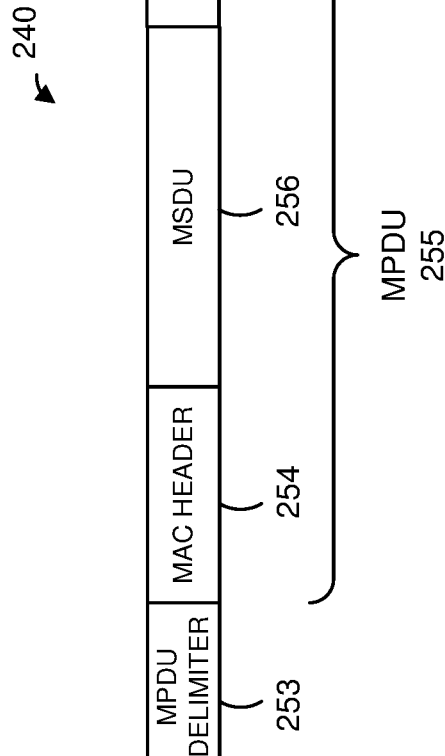
FIG. 2B is a diagram of an example data portion of the PHY data unit of FIG. 2A, according to an embodiment.

FIG. 2B is a diagram of a MAC layer data unit 240, according to an embodiment. In an embodiment, the MAC layer data unit 240 is included in the data portion 220 of the PHY data unit 200 of FIG. 2A. In another embodiment, the MAC layer data unit 240 is included in a data portion of a PHY data unit different from the PHY data unit 200 of FIG. 2A. The MAC layer data unit 240 includes a MPDU delimiter 253 followed by an MPDU 255. The MPDU 255 includes a MAC header 254 and a MAC layer service data unit (MSDU) 256. In some embodiments, the data portion 220 of the PHY data unit 200 of FIG. 2A includes an aggregate MPDU (A-MPDU) that aggregates multiple MPDU delimiter fields 253, each MPDU delimiter field 253 followed by a respective MPDU 255. In some embodiments, each of one or more of the MSDUs 256 included in the data unit 240 is an aggregate MSDU (A-MSDU) that aggregates multiple MSDUs. In such embodiments, the MAC header 254 of the A-MSDU is followed by multiple MSDUs. In an embodiment, the first communication protocol defines a maximum number of MPDUs and, accordingly, a maximum number of MSDUs/A-MSDUs, that can be aggregated in a single A-MPDU. For example, the first communication protocol specifies that a maximum of 256 MPDUs, 512 MPDUs, 1024 MPDUs, or any other suitable number of MPDUs, can be aggregated in a single A-MPDU, in an embodiment. In another embodiment, the first communication protocol specifies another suitable maximum number of MPDUs that can be aggregated in a single A-MPDU.

In some embodiments, the MAC layer data unit 240 additionally includes one or more padding portions (not illustrated), each of the one or more padding portions having one or more padding bits. For example, a respective padding portion is included with (e.g., appended to) each of the one or more MPDUs 255 and/or MSDUs 256 in the data unit 240 to ensure that each MPDU 255 and/or MSDU 256 includes an integer number of octets of bits indicated by a length indicator in the MPDU delimiter 253 that immediately precedes the MPDU 255, in an embodiment.

Figure 3:
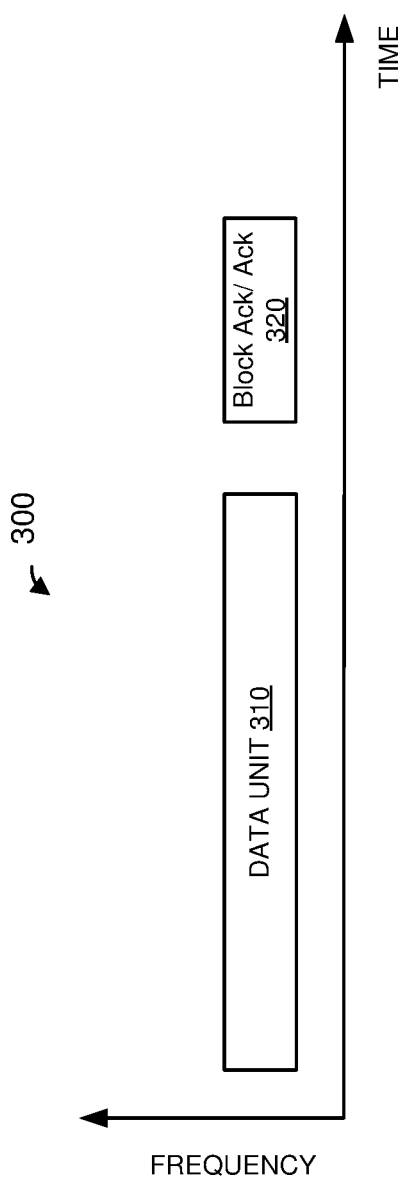
FIG. 3 is a diagram of an example transmission sequence in a WLAN, according to an embodiment.

FIG. 3 is a diagram of an example transmission sequence 300 in a WLAN such as the WLAN 110, according to an embodiment. A transmitting device generates and transmits a PHY data unit 310. In an embodiment, the PHY data unit 310 corresponds to the PHY data unit 200 of FIG. 2A. In another embodiment, the PHY data unit 310 is a suitable data unit different from the PHY data unit 200 of FIG. 2A. A receiving device receives the PHY data unit 310 and, in response to receiving the PHY data unit 310, generates and transmits a PHY data unit 320 that includes an acknowledgment (ACK) frame to acknowledge receipt of one or more MAC layer data units (e.g., MPDUs) in the PHY data unit 310. The PHY data unit 320 is sometimes referred to herein as an "ACK packet". In an embodiment, the transmitting device is an AP (e.g., AP 114) and the receiving device is a client station (e.g., the client station 154-1). In another embodiment, the transmitting device is a client station (e.g., the client station 154-1) and the receiving device is the AP (e.g., AP 114). In yet another embodiment, the transmitting device is a first client station (e.g., the client station 154-1) and the receiving device is a second client station (e.g., the client station 154-2).

In an embodiment, the PHY data unit 310 includes an A-MPDU that aggregates multiple MPDUs. For ease of explanation, the PHY data unit 310 is sometimes referred to herein as an A-MPDU 310. In an embodiment, the A-MPDU 310 includes one or more MPDUs corresponding to each of one or more traffic classes, where each traffic class is associated with a particular traffic type (e.g., network control, video, voice, streaming multimedia, etc.). In an embodiment, the traffic classes are associated with particular quality of service (QoS) requirements and/or priority levels (e.g., background, best effort, video, voice, etc.). In an embodiment, each traffic class corresponds to a particular traffic identifier (TID). In an embodiment, the A-MPDU 310 includes one or more sets of multiple MPDUs corresponding to one or more traffic classes for which block acknowledgement sessions have been previously set up between the transmitting device and the receiving device and are currently active. For example, the A-MPDU 310 includes a first set of multiple MPDUs corresponding to a first traffic class, such as a traffic class that corresponds to voice traffic, for which a first block acknowledgement session between the transmitting device and the receiving device is currently active, in an embodiment. The A-MPDU 310 additionally or alternatively includes a second set of multiple MPDUs corresponding to a second traffic class, such as a traffic class that corresponds to web page traffic, for which a second block acknowledgement session between the transmitting device and the receiving device is currently active.

In an embodiment, the A-MPDU 310 additionally or alternatively includes one or more management and/or control frames for which acknowledgement is required or expected. Management frames included in the A-MPDU 310 generally carry information used to manage communication devices operating in the WLAN (e.g., WLAN 110), in at least some embodiments. Examples of management frames included in the A-MPDU 310, according to some embodiments, include an association request data unit, an association response data unit, a re-association request data unit, a re-association response data unit, a probe request data unit, a probe response data unit, etc. Control frames included in the A-MPDU 310 generally carry information used to assist in delivery of data and/or control channel access in the WLAN (e.g., WLAN 110), in at least some embodiments. Examples of control frames included in the A-MPDU 310 include a power save poll (PS-poll) data unit, a block acknowledgement request (BAR) data unit, etc. In an embodiment, the number of management and/or control frames that can be included in the A-MPDU 310 is limited to one management frame or one control frame. In another embodiment, the A-MPDU 310 includes multiple management frames and/or control frames. In an embodiment, a management frame included in the A-MPDU 310 is a unicast frame from the transmitting device to the receiving device. Aggregation of multicast or broadcast management and control frames in the A-MPDU 310 is not allowed, in an embodiment.

Upon receiving the A-MPDU 310, the receiving device transmits the acknowledgement frame 320 to the transmitting device. In an embodiment, the receiving device is a client station (e.g., the client station 154-1) and the client stations transmits the acknowledgement packet 320 to the AP (e.g., the AP 114). The acknowledgement packet 320 includes a MAC control frame (e.g., an ACK frame, a block ACK (BA) frame, etc.), in an embodiment. In some embodiments, the acknowledgement packet 320 includes a block acknowledgement (BA) frame. For ease of explanation, the acknowledgment packet 320 is sometimes referred to herein as a "block acknowledgement frame" or a "BA frame". In some embodiments, the block acknowledgement frame 320 includes block acknowledgement information to acknowledge, to the AP, receipt of multiple MAC frames included in the A-MPDU 310 transmitted to the client station by the AP.

In some embodiments, prior to the transmission sequence 300, the transmitting device and the receiving device negotiate aggregation and/or block acknowledgement parameters to be used in the transmission sequence 300. For example, the transmitting device and/or the receiving device announces whether or not the device supports aggregation of MPDUs corresponding to multiple traffic classes in a single A-MPDU and/or aggregation of management frames with MPDUs that include data. Thus, for example, if the receiving device and the transmitting device both support aggregation of MPDUs corresponding to multiple traffic classes, then the transmitting device aggregates MPDUs corresponding to multiple traffic classes in the A-MPDU 310, in at least some situations, in an embodiment. On the other hand, if the receiving device and/or the transmitting device do not support aggregation of MPDUs corresponding to multiple traffic classes, the transmitting device limits aggregation in the A-MPDU 310 to only a single traffic class, in an embodiment.

In an embodiment, the transmitting device and/or the receiving device additionally or alternatively announces whether or not the device supports acknowledgement of MPDUs corresponding to multiple traffic classes in a single acknowledgement frame. If the transmitting device and the receiving device both support acknowledgement of MPDUs corresponding to multiple traffic classes in a single acknowledgement frame, then the receiving device includes acknowledgement information corresponding to multiple traffic classes in the block acknowledgement frame 320. On the other hand, in an embodiment, if the receiving device and/or the transmitting device does not support acknowledgement of MPDUs corresponding to multiple traffic classes in a single acknowledgement frame, and the A-MPDU 310 that aggregates multiple MPDUs corresponding to multiple traffic classes, then the receiving devices may acknowledge the A-MPDU 310 by transmitting multiple acknowledgement data units (e.g., included in respective PHY data units transmission of which is separated by an interframe space) that respectively acknowledge MPDUs of different traffic classes.

Figure 4:
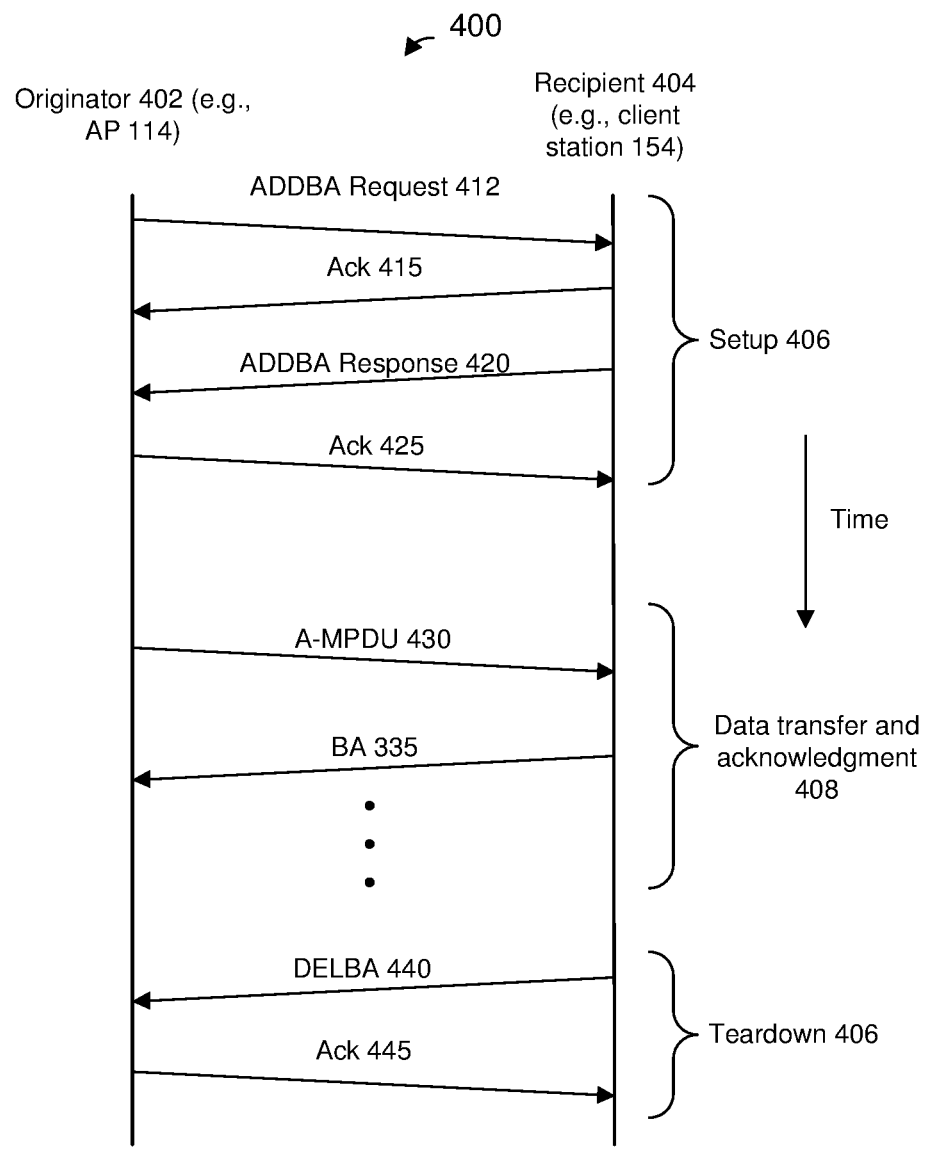
FIG. 4 is a timing diagram of the example frame exchange corresponding to a block acknowledgment (BA) procedure between different communication devices, according to an embodiment.

In an embodiment, in order for two communication devices to employ a procedure such as illustrated in FIG. 3, the two communication devices first set up a BA session. FIG. 4 is a timing diagram of an example frame exchange 400 corresponding to a BA session between different communication devices. Originator 402 and recipient 404 correspond to respective communication devices in a WLAN (e.g., the AP 114 and the client station 154 in the WLAN 110). As an example, the originator 402 corresponds to the AP 114 and the recipient 304 corresponds to the client station 154-1. As another example, the originator 402 corresponds to the client station 154-1, and the recipient 404 corresponds to the client station 154-2. In other embodiments, the originator 402 and/or the recipient 404 are other suitable communication devices.

The frame exchange 400 includes at least a BA session setup portion 406, a BA session data transfer and acknowledgment portion 408, and a BA session teardown portion 410. The setup portion 406 corresponds to a negotiation of a BA agreement between the originator 402 and the recipient 404. The data transfer and acknowledgment portion 408 corresponds to transmission of A-MPDUs by the originator 402 and the transmission of BA frames by the recipient 404 in accordance with the negotiated BA agreement. Although FIG. 4 illustrates the transmission of one A-MPDU and one BA frame, the data transfer and acknowledgment portion 408 may include the transmission of multiple A-MPDUs and multiple BA frames. The teardown portion 410 corresponds to an ending of the BA agreement between the originator 402 and the recipient 404.

The originator 402 generates and transmits an add block acknowledgment (ADDBA) request frame 412 to the recipient 404 to initiate a BA session between the originator 402 and the recipient 404. The ADDBA request frame 412 corresponds to a request, by the originator 402, to participate in a BA procedure with the recipient, and includes information that is used to negotiate the BA agreement between the originator 402 and the recipient 404. For instance, in an embodiment, the ADDBA request frame 412 includes an indication of a number of buffers requested to be allocated at the recipient 404 to buffer communication frames to be transmitted by the originator 402 during the data transfer and acknowledgment portion 408. In an embodiment, the number of buffers requested is determined based on a number of communication frames that the originator 402 is to transmit during the data transfer and acknowledgment portion 408.

In response to reception of the ADDBA request frame 412, the recipient 404 generates and transmits an acknowledgment frame 415 to the originator 402 acknowledging the reception of the ADDBA request frame 412.

The recipient 404 generates and transmits an ADDBA response frame 420 responding to the ADDBA request frame 412. The ADDBA response frame 420 can either accept or reject the request to participate in the BA session with the originator 402, according to an embodiment. If the ADDBA response frame 420 accepts the request to participate in the BA session, the ADDBA response frame 420 includes information for negotiating the BA agreement with the originator 402. For instance, in an embodiment, the ADDBA response frame 420 includes an indication of a number of buffers allocated at the recipient 404 for buffering communication frames transmitted by the originator 402 during the data transfer and acknowledgment portion 408.

In an embodiment, the allocated number of buffers indicated in the ADDBA response frame 420 may be different than the number of buffers indicated in the ADDBA request frame 410. In one such embodiment, to account for the difference, the originator 402 may adjust a maximum A-MPDU duration that the originator 402 is permitted to transmit to the recipient 404.

In response to the reception of the ADDBA response frame 420, the originator 402 generates and transmits an acknowledgment frame 425 to the recipient 404 acknowledging the reception of the ADDBA response frame 420.

Data transmission from the originator 402 to the recipient 404 occurs during the data transfer and acknowledgment portion 408. The originator 402 transmits an A-MPDU 430 that includes multiple MPDUs to the recipient 404. In an embodiment, a number of MPDUs in the A-MPDU 430 corresponds to the allocated number of buffers at the recipient 404.

Following the reception of the A-MPDU, the recipient 404 transmits a BA frame 435 to the originator 402 to acknowledge the reception of at least some of the MPDUs within the A-MPDU 430. The BA frame 435 indicates whether each of the MPDUs within the A-MPDU 430 was successfully received at the recipient 404.

If one of the originator 402 or the recipient 404 want to end the BA agreement, the BA agreement is ended during the BA session teardown portion 406. In the example illustrated in FIG. 4, the recipient 404 generates and transmits a delete BA (DELBA) frame 440 to the originator 404. The DELBA frame 440 indicates that the recipient 404 wants to end the BA agreement. The originator 402 then transmits an ACK 445 and the BA session is ended. As another example, if the originator 402 wants to end the BA session, the originator 402 generates and transmits the DELBA frame 440 to the recipient 404, and the recipient 404 transmits an ACK 445. The BA session is then ended.

After the end of the BA session, if the originator 402 wants to start a new BA session, the originator 402 and the recipient 404 exchange a further ADDBA request frame and a further ADDBA response frame, along with associated ACK frames, such as in the setup portion 406 illustrated in FIG. 4.

In prior art WiFi systems, the recipient 404 is not able to change any BA session parameters during the BA session short of ending the BA session entirely. Once the recipient 404 ends a BA session, the recipient 404 in a prior art WiFi system typically cannot inform the originator 402 that the recipient 404 wants to start another BA session. Additionally, once the recipient 404 ends a BA session, a typical originator 402 will not again attempt to establish a BA session with the recipient 404, at least not in the near future. Thus, if the client station 154 (acting as the recipient 404) determines that a BA session parameter is not acceptable in light of an upcoming time slot reserved for Bluetooth transmissions and thus decides to end the BA session, there is not a suitable mechanism in prior art WiFi systems for the client station 154 to prompt the AP to start a new BA session after the time slot reserved for Bluetooth transmissions has ended, and a prior art AP will typically not do so.

Accordingly, a new MAC action frame is defined to permit a client station 154 (acting as a recipient in a BA session) to prompt the AP 114 (acting as an originator in the BA session) to at least one of i) modify one or more parameters of the BA session without ending the BA session, ii) revert the one or more parameters of the BA session back to their previous values (e.g., as negotiated during a setup portion (e.g., the setup portion 406)), iii) stop transmitting data to the client station 154 during the BA session without ending the BA session, iv) resume transmitting data to the client station 154 during the BA session without ending the BA session, etc. In some embodiments, the originator of a BA session can also use the new MAC action frame to prompt the recipient to at least one of i) modify one or more parameters of the BA session without ending the BA session, ii) revert the one or more parameters of the BA session back to their previous values (e.g., as negotiated during a setup portion (e.g., the setup portion 406)), iii) stop transmitting during the BA session without ending the BA session, iv) resume transmitting data during the BA session without ending the BA session, etc.

Figure 5:
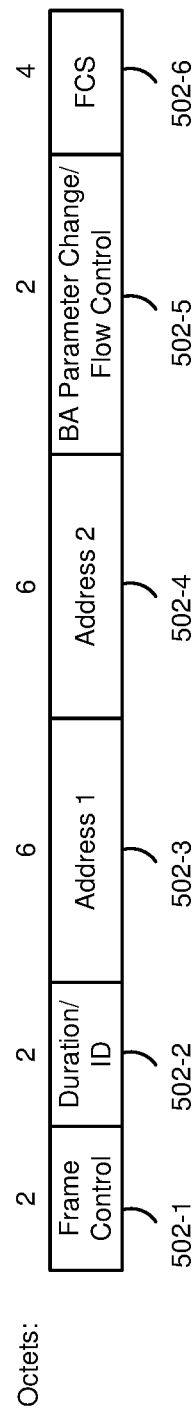
FIG. 5 is a diagram of an example media access control (MAC) frame for indicating a change in a BA procedure, according to an embodiment.

FIG. 5 is a diagram of an example MAC action frame 500 (sometimes referred to herein as an "update BA parameter request frame" or "UPDBA request frame"), according to an embodiment. The UPDBA request frame 500 is included in a PHY data unit (e.g., a packet) and transmitted via a wireless communication channel during a BA session, according to an embodiment.

The UPDBA request frame 500 includes a plurality of fields 502. In the embodiment illustrated in FIG. 5, the fields 502 include a frame control field 502-1, a duration/ID field 502-2, a first address (e.g., a receiver address) field 502-3, a second address (e.g., a transmitter address) field 502-4, a BA parameter change/flow control field 502-5, and a data unit sequence check (FCS) field 502-6. The number indicated above each of the fields 502 in FIG. 5 indicates an example number of octets of bits in the corresponding field 502. In other embodiments, one or more of the fields 502 has a different suitable length. In other embodiments, one or more additional fields are included in the acknowledgment frame 500 and/or one or more of the fields 502 are omitted from the acknowledgment frame 500.

In an embodiment, the BA parameter change/flow control field 502-5 indicates a required or requested change in a BA session between i) the recipient 404 (e.g., the client station 154), and ii) the originator 402 (e.g., the AP 114). In an embodiment, the indicated change is a mandatory change. In another embodiment, the indicated change is an optional change. The indication of the change includes an indication to stop transmitting A-MPDUs to the recipient 404, in an embodiment. In some embodiments, the indication of the change includes an indication to shorten a maximum length of A-MPDUs that are permitted to be transmitted during the BA session. The indication to shorten the maximum length of A-MPDUs includes an indication of a number of buffers that are available at the recipient 404 to store MPDUs that are to be acknowledged by a BA, wherein the indicated number of buffers is selected to prompt the originator 402 to stop transmitting A-MPDUs to the recipient 404 altogether or to shorten the maximum length of A-MPDUs that the originator 402 is transmitting to the recipient 404 with respect to a previous maximum length of A-MPDUs permitted to be transmitted to the client station during the BA session (e.g., according to parameters previously negotiated during a BA session setup portion (e.g., the setup portion 406 (FIG. 4))), in an embodiment. The indication to shorten the maximum length of A-MPDUs includes an indication of a fraction with respect to a previous maximum length of A-MPDUs permitted to be transmitted to the client station during the BA session (e.g., according to parameters previously negotiated during a BA session setup portion (e.g., the setup portion 406 (FIG. 4))), in an embodiment.

In some embodiments, the indication of the change includes an indication of a change to a timeout parameter value, wherein the timeout parameter corresponds to a timeout duration, and wherein the originator 402 is configured to end the BA session if the originator 402 does not transmit any data frames to the recipient 404 for a length of time at least equal to the timeout duration. For example, the recipient 404 may want to increase the timeout parameter value so that the originator 402 does not end the BA session due to inactivity during a Bluetooth timeslot.

In some embodiments, the indication of the change includes an indication of a time period during which transmissions of A-MPDUs are to be stopped during the BA session. In some scenarios, the multiple MAC frames included in an A-MPDUs being transmitted during the BA session correspond to a particular traffic class, and the indication of the change includes an indication to stop transmitting A-MPDUs corresponding to the particular traffic class during the BA session. In other scenarios, the multiple MAC frames included A-MPDUs transmitted during the BA session correspond to multiple different traffic classes, and the indication of the change includes an indication to stop transmitting A-MPDUs that include MAC frames corresponding to any of the multiple different traffic classes during the BA session.

The recipient 404 transmits the UPDBA request frame 500 to the originator 402 to prompt the originator 402 to use one or more different parameter values during a BA session, according to an embodiment. The originator 402 transmits the UPDBA request frame 500 to the recipient 404 to prompt the recipient 404 to use one or more different parameter values during a BA session, according to another embodiment.

In response to receiving the UPDBA request frame 500 from the recipient 404, the originator 402 adopts, during the BA session, the one or more different parameter values indicated by the UPDBA request frame 500, according to an embodiment. Also in response to receiving the UPDBA request frame 500, the originator 402 generates and transmits a UPDBA response frame to confirm that the originator 402 is adopting the one or more different parameter values during the BA session, according to an embodiment. In an embodiment, the UPDBA response frame has a format similar to the UPDBA request frame 500. For example, the UPDBA response frame includes fields 502-1, 502-2, 502-3, 502-4, and 502-6. Also, the UPDBA response frame includes a BA parameter change/flow control field to indicate changes to one or more different parameter values being adopted during the BA session, according to an embodiment. The BA parameter change/flow control field additionally or alternatively confirms that the originator 402 will stop transmitting A-MPDUs to the recipient 404 during the BA session, according to an embodiment.

In another embodiment, in response to receiving the UPDBA request frame 500 that includes an indicator to stop transmitting A-MPDUs, the originator 402 stops transmitting A-MPDUs to the recipient 404 during the BA session.

When the recipient 404 wants the originator 402 to resume using original parameter values and/or resume transmitting A-MPDUs to the recipient 404, the transmits a further UPDBA request frame 500 indicating that the recipient 404 wants the originator 402 to resume using original parameter values and/or resume transmitting A-MPDUs to the recipient 404, according to an embodiment. In response to receiving the further UPDBA request frame 500, the originator 402 adopts, during the BA session, original parameter values and/or resumes transmitting A-MPDUs to the recipient 404, according to an embodiment. Also in response to receiving the further UPDBA request frame 500, the originator 402 generates and transmits a further UPDBA response frame to confirm that the originator 402 is adopting the one or more different parameter values and/or resuming transmission of A-MPDUs to the recipient 404 during the BA session, according to an embodiment.

In response to receiving the UPDBA request frame 500 from the originator 402, the recipient 404 adopts, during the BA session, the one or more different parameter values indicated by the UPDBA request frame 500, according to an embodiment. Also in response to receiving the UPDBA request frame 500, the recipient 404 generates and transmits a UPDBA response frame to confirm that the recipient 404 is adopting the one or more different parameter values during the BA session, according to an embodiment.

When the originator 402 wants the recipient 404 to resume using original parameter values, the originator 402 transmits a further UPDBA request frame 500 indicating that the originator 402 wants the recipient 404 to resume using original parameter values, according to an embodiment. In response to receiving the further UPDBA request frame 500, the recipient 404 adopts, during the BA session, original parameter values, according to an embodiment. Also in response to receiving the further UPDBA request frame 500, the recipient 404 generates and transmits a further UPDBA response frame to confirm that the recipient 404 is adopting the one or more different parameter values during the BA session, according to an embodiment.

Figure 6:
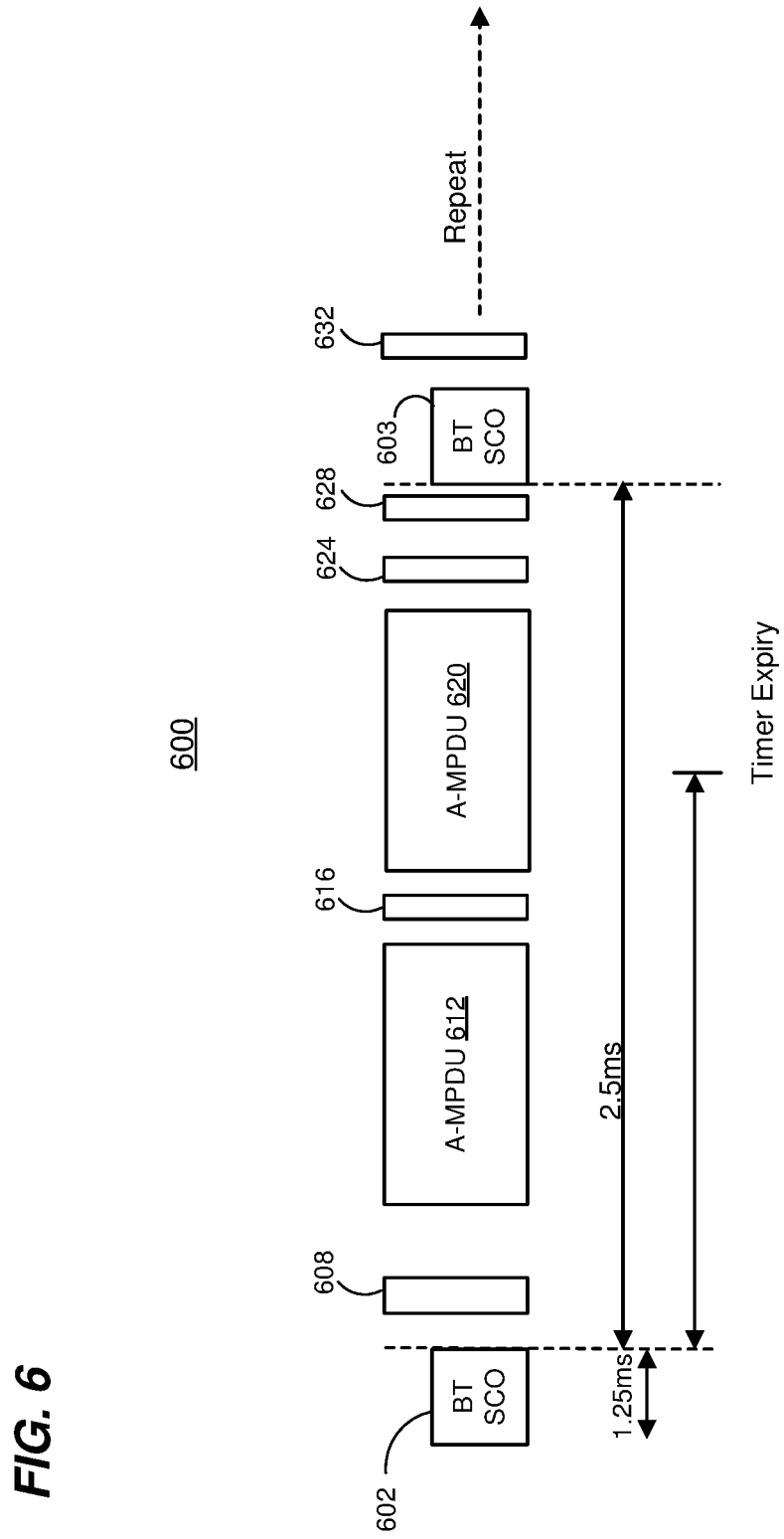
FIG. 6 is a timing diagram illustrating an example process regulating the transmission of WLAN data packets to facilitate interference avoidance with a Bluetooth connection, according to an embodiment.

FIG. 6 is a timing diagram 600 illustrating an example process in which a first communication device utilizes a power management mode of a WLAN to stop a second communication device from sending WLAN packets to the first device approximately when a Bluetooth transmission is expected between the first communication device and a third communication device. The first communication device is a client station such as the client station 154, in an embodiment. The second communication device is an AP such as the AP 114, in an embodiment. In the example process of FIG. 6, a time-sharing scheme is generally utilized. For example, Bluetooth transmissions are spaced apart so that WLAN transmissions may occur in between the Bluetooth transmissions, in an embodiment.

Timeslots 602, 603, etc., are reserved for Bluetooth synchronous connection oriented (SCO) data transmissions between the first communication device and the third communication device, which occur via a Bluetooth link, in an embodiment. In an embodiment, the duration of each timeslot 602, 603, etc., is 1.25 ms. In another embodiment, the duration of each timeslot 602, 603, etc., is another suitable length that is longer or shorter than 1.25 ms. In an embodiment, a 2.5 ms timeslot is available between adjacent pairs of timeslots 602, 603, etc., for WLAN transmissions between the first communication device and the second communication device.

In an embodiment, the client station transmits, prior to each Bluetooth timeslot 602, 603, etc., a frame to the AP to prompt the AP to i) use one or more different parameter values during a BA session and/or ii) refrain from transmitting to the client station during the BA session. For example, the client station transmits, prior to each Bluetooth timeslot 602, 603, etc., an UPDBA request frame (e.g., the UPDBA request frame 500) that indicates to the AP that the AP should i) use one or more different parameter values during the BA session and/or ii) refrain from transmitting to the client station. Similarly, the client station transmits, after each Bluetooth timeslot 602, 603, etc., a frame to the AP to prompt the AP to resume i) use one or more original parameter values during a BA session and/or ii) transmitting to the client station. For example, the client station transmits, after each Bluetooth timeslot 602, 603, etc., a further UPDBA request frame (e.g., the UPDBA request frame 500) that indicates to the AP that the AP should i) use one or more original parameter values during a BA session and/or ii) resume transmitting to the client station.

In conjunction with the Bluetooth transmission 602 ending, the client station starts a timer (e.g., of the network interface 162, of the MAC processor 166, etc.). The timer may be configured to expire at some desired or pre-determined time before the beginning of the next Bluetooth timeslot 603. In the example of FIG. 6, it is known or expected that the next Bluetooth timeslot 603 is to occur 2.5 ms after the end of the previous Bluetooth transmission 602. Thus, the timer may be configured to expire at a time 2.5 ms—DELTA, where DELTA is a suitable time duration that is determined based on a maximum of length of A-MPDUs that the AP 114 is transmitting during the BA session, according to an embodiment. In other embodiments, DELTA is additionally or alternatively determined based on one or more suitable parameters.

After an end of the Bluetooth timeslot 602, the client station transmits a packet 608 (e.g., including a first UPDBA request frame) to the AP to indicate to the AP that the AP should i) use one or more original parameter values during the BA session and/or ii) the AP can resume transmitting to the client station. In response to receiving the packet 608, the AP resumes transmitting A-MPDUs to the client station according to one or more BA sessions previously set up with the client station.

For example, the AP transmits an A-MPDU 612 to the client station. In response to receiving the A-MPDU 612, the client station transmits an ACK packet 616 to acknowledge one or more MPDUs in the A-MPDU 612. In an embodiment, the ACK packet 616 includes a BA frame. Next, the AP transmits another A-MPDU 620 to the client station, and in response to receiving the A-MPDU 620, the client station transmits an ACK packet 624 to acknowledge one or more MPDUs in the A-MPDU 620. In an embodiment, the ACK packet 624 includes a BA frame.

The client station determines that the client station should prompt the AP to i) use one or more different parameter values during the BA session and/or ii) refrain from transmitting to the client station during the BA session. For example, the client station determines that the client station should prompt the AP to i) use one or more different parameter values during the BA session and/or ii) refrain from transmitting to the client station during the BA session in response to the timer expiring.

Thus, the client station generates and transmits a packet 628 that prompts the AP to i) use one or more different parameter values during a BA session and/or ii) refrain from transmitting to the client station during the BA session. For example, the packet 628 includes an UPDBA request frame (e.g., the UPDBA request frame 500) that indicates to the AP that the AP should i) use one or more different parameter values during the BA session and/or ii) refrain from transmitting to the client station.

In response to receiving the packet 628, the AP implements the change in the BA session indicated in the packet 628. For example, the AP stops transmitting, at least temporarily, A-MPDUs to the client station. As another example, the AP stops transmitting to the client station, at least temporarily, A-MPDUs having durations that are above a threshold duration. As yet another example, the AP stops transmitting any data frames to the client station.

After the Bluetooth timeslot 603 has ended, the client station transmits a packet 632 to the AP to indicate to the AP that the AP is to i) use one or more original parameter values during the BA session and/or ii) resume transmitting to the client station. For example, the packet 632 includes an UPDBA request frame (e.g., the UPDBA request frame 500) that indicates to the AP that the AP should i) use one or more original parameter values during the BA session and/or ii) resume transmitting to the client station.

In another embodiment, the client station additionally transmits, prior to each Bluetooth timeslot 602, 603, etc., another frame to the AP to prompt the AP to refrain from transmitting to the client station. For example, the client station transmits, prior to each Bluetooth timeslot 602, 603, etc., a frame (e.g., a QoS Null frame with a power management (PM) field set to logic one) that indicates to the AP that the client station is entering a PM mode. Similarly, the client station transmits, after each Bluetooth timeslot 602, 603, etc., a frame to the AP to prompt the AP to resume transmitting to the client station. For example, the client station transmits, after each Bluetooth timeslot 602, 603, etc., a frame (e.g., a further QoS Null frame with the PM field set to logic zero) that indicates to the AP that the client station is no longer in the PM mode.

Figure 7:
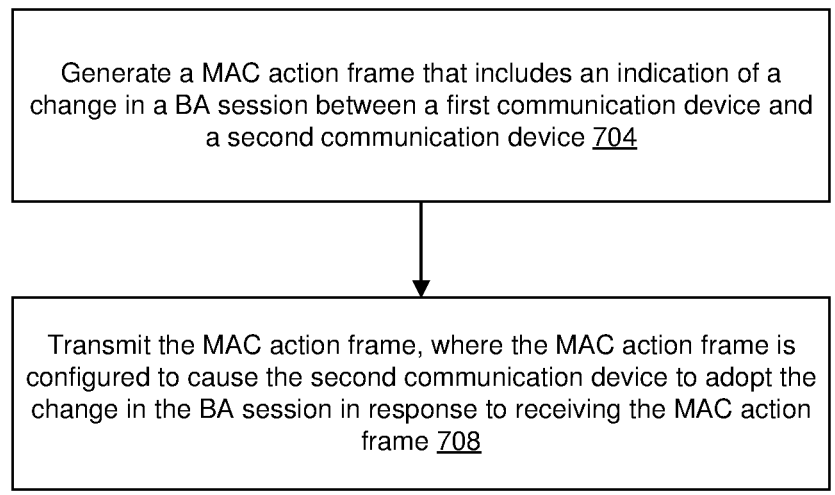
FIG. 7 is a flow diagram of an example method for communication in a wireless communication network, according to an embodiment.

FIG. 7 is a flow diagram of an example method 700 performed by a communication in a communication network, according to an embodiment. In an embodiment, the method 700 is implemented by a first communication device. The first communication device is an AP such as the AP 114 or a client station such as the client station 154-1, for example, in various embodiments. For example, the method 700 is implemented by the network interface device 122 (e.g., the MAC processor 126 and/or by the PHY processor 130) of the AP 114, in an embodiment. As another example, the method 700 is implemented by the network interface device 162 (e.g., the MAC processor 166 and/or by the PHY processor 170) of the client station 154-1, in another embodiment. In other embodiments, the method 700 is implemented by another suitable communication device.

At block 704, a MAC action frame that includes an indication of a change in a BA session between the first communication device and a second communication device is generated by the first communication device. For example, the second communication device is an AP such as the AP 114 or a client station such as the client station 154-1, in various embodiments. In an embodiment, the UPDBA request frame 500 of FIG. 5 is generated at block 704. In another embodiment, a suitable MAC action frame different from the UPDBA request frame 500 is generated at block 704.

In an embodiment, the BA session was established by the second communication device transmitting a request (e.g., an ADDBA request frame) to the first communication device to start the BA session, and the first communication device transmitting a response (e.g., an ADDBA response frame) to the second communication device. In another embodiment, the BA session was established by the first communication device transmitting a request (e.g., an ADDBA request frame) to the second communication device to start the BA session, and the second communication device transmitting a response (e.g., an ADDBA response frame) to the first communication device.

In an embodiment, the MAC action frame generated at block 704 includes an indication that the transmission of A-MPDUs during the BA session should be stopped. In an embodiment, the MAC action frame generated at block 704 includes an indication that a maximum length of A-MPDUs transmitted during the BA session should be shortened. For example, the MAC action frame generated at block 704 includes an indication of a fraction with respect to a previous maximum length of A-MPDUs set for the BA session, in an embodiment. In another embodiment, the MAC action frame generated at block 704 includes an indication of a different timeout parameter value corresponding to the BA session. The MAC action frame generated at block 704 includes an indication that the second communication device is to stop transmitting data frames to the first communication device, in an embodiment. The MAC action frame generated at block 704 includes an indication that the first communication device will stop transmitting data frames to the second communication device, in another embodiment.

At block 708, the MAC action frame generated at block 704 is transmitted to the second communication device. The MAC action frame transmitted at block 708 is configured to cause or prompt the second communication device to adopt the change in the BA session in response to receiving the MAC action frame, in an embodiment. For example, the BA frame transmitted at block 708 is configured to cause or prompt the second communication device to stop transmitting A-MPDUs to the first communication device, in an embodiment. In an embodiment, the MAC action frame transmitted at block 708 is configured to cause or prompt the second communication device to shorten a maximum length of A-MPDUs to be transmitted to the first communication device. For example, the MAC action frame transmitted at block 708 is configured to cause or prompt the second communication device to shorten a maximum length of A-MPDUs to be transmitted to the first communication device by a fraction with respect to a previous maximum length of A-MPDUs transmitted to the first communication device, in an embodiment. In an embodiment, the MAC action frame transmitted at block 708 is configured to cause or prompt the second communication device to stop transmitting data frames to the first communication device. In an embodiment, the MAC action frame transmitted at block 708 is configured to cause or prompt the second communication device to adopt a different timeout parameter value corresponding to the BA session.

In an embodiment, the MAC action frame transmitted at block 708 is configured to cause or prompt the second communication device to stop transmissions of A-MPDUs to the first communication device during the BA session during a particular time period indicated in the MAC action frame. In an embodiment in which the MAC action frame (transmitted at block 708) indicates a time period during which the change in the BA session is to be implemented, the second communication device is configured to resume use of original BA session parameters after the time period has ended, without an explicit prompt from the first communication device to resume use of the original BA session parameters.

In an embodiment, the method further comprises receiving, at the first communication device, a further MAC action frame from the second communication device, wherein the further MAC action frame confirms that the second communication device has adopted the change in the BA session.

In an embodiment, the method 700 further comprises adopting, at the first communication device, the change in the BA session. In an embodiment, adopting, at the first communication device, the change in the BA session is performed in conjunction with transmitting the MAC action frame at block 708.

Figure 8:
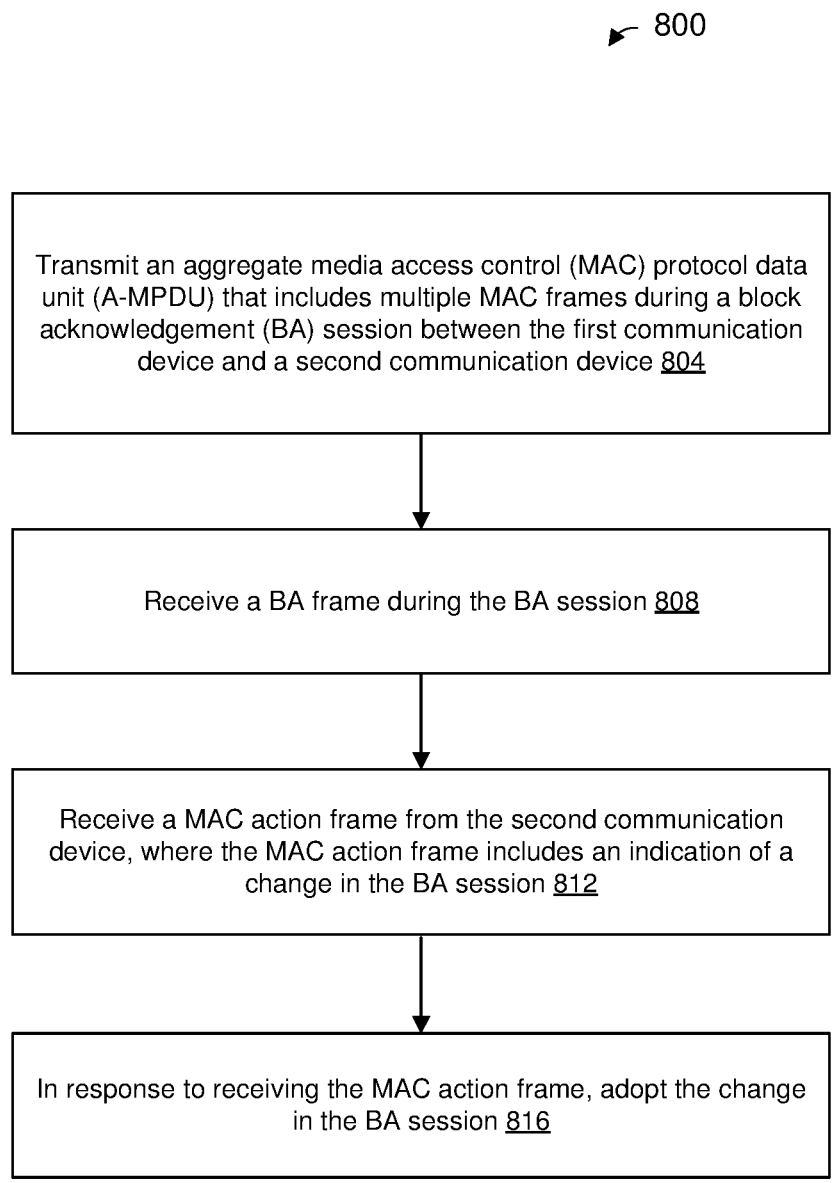
FIG. 8 is a flow diagram of another example method for communication in a wireless communication network, according to an embodiment.

FIG. 8 is a flow diagram of an example method 800 for communication in a communication network, according to an embodiment. In an embodiment, the method 800 is implemented by a first communication device. The first communication device is an AP such as the AP 114 or a client station such as the client station 154-1, for example, in various embodiments. For example, the method 800 is implemented by the network interface device 122 (e.g., the MAC processor 126 and/or by the PHY processor 130) of the AP 114, in an embodiment. As another example, the method 800 is implemented by the network interface device 162 (e.g., the MAC processor 166 and/or by the PHY processor 170) of the client station 154-1, in another embodiment. In other embodiments, the method 800 is implemented by another suitable communication device.

At block 804, the first communication device transmits an A-MPDU that includes multiple MAC frames during a BA session between the first communication device and a second communication device, where the A-MPDU is intended for the second communication device. For example, the second communication device is an AP such as the AP 114 or a client station such as the client station 154-1, in various embodiments.

In an embodiment, the BA session was established by the first communication device transmitting a request (e.g., an ADDBA request frame) to the second communication device to start the BA session, and the second communication device transmitting a response (e.g., an ADDBA response frame) to the first communication device.

At block 808, the first communication device receives a BA frame from the second communication device. In an embodiment, the BA frame in the ACK packet 320 of FIG. 3 is received at block 808. In another embodiment, a suitable acknowledgement frame different from the BA frame in the ACK packet 320 of FIG. 3 is received at block 808.

At block 812, the first communication device receives a MAC action frame from the second communication device. In an embodiment, the MAC action frame received at block 812 is the UPDBA request frame 500 of FIG. 5. In another embodiment, a suitable MAC action frame different from the UPDBA request frame 500 is received at block 812.

In an embodiment, the MAC action frame received at block 808 includes an indication of a change in the BA session between the first communication device and the second communication device. In an embodiment, the indication of the change included in the MAC action frame received at block 812 is an indication that the transmission of A-MPDUs during the BA session should be stopped. In an embodiment, the indication of the change included in the MAC action frame received at block 812 is an indication that a maximum length of A-MPDUs transmitted during the BA session should be shortened. For example, the indication to shorten the maximum length of A-MPDUs includes an indication of a fraction with respect to a previous maximum length of A-MPDUs transmitted to the second communication device, in an embodiment. In an embodiment, the MAC action frame received at block 812 also indicates a time period during which the change to the BA session should be effectuated. In an embodiment, the MAC action frame received at block 812 also indicates a time period during which the stopping of transmissions of A-MPDUs is to occur. In an embodiment, the MAC action frame received at block 812 also indicates a time period during which a shorter maximum length of A-MPDUs should be utilized.

In another embodiment, the MAC action frame received at block 812 includes an indication of a different timeout parameter value corresponding to the BA session. The MAC action frame received at block 812 includes an indication that the first communication device is to stop transmitting data frames to the second communication device, in an embodiment.

In response to receiving the MAC action frame at block 812, at block 816 the first communication device adopts the change in the BA session indicated in the BA frame. In an embodiment, the change adopted by the first communication device at block 812 is stopping transmitting A-MPDUs to the second communication device during the BA session. In an embodiment, the change adopted by the first communication device at block 816 is transmitting only A-MPDUs having a duration less than or equal to the shortened maximum length to the second communication device during the BA session. In an embodiment, the change adopted by the first communication device at block 816 is stopping transmission of A-MPDUs to the second communication device during the time period indicated in the received BA frame.

In an embodiment in which the MAC action frame (received at block 812) indicates a time period during which the change in the BA session is to be implemented, the second communication device is configured to resume use of original BA session parameters after the time period has ended, without an explicit prompt from the second communication device to resume use of the original BA session parameters. Thus, in an embodiment, the method 800 further includes (not shown in FIG. 8) the first communication device resuming use of the original BA session parameters after the time period has ended, without an explicit prompt from the second communication device to resume use of the original BA session parameters. In an embodiment, after stopping transmitting A-MPDUs to the second communication device during the BA session at block 816, in response to receiving the MAC action frame at block 812, the first communication device resumes transmitting A-MPDUs to the second communication device during the BA session after the indicated time period has ended. In an embodiment, after transmitting only A-MPDUs having a duration less than or equal to the shortened maximum length to the second communication device during the BA session, the first communication device resumes transmitting A-MPDUs having lengths greater than the shortened maximum length to the second communication device during the BA session after the indicated time period has ended. In an embodiment, the first communication device resumes transmitting A-MPDUs having lengths greater than the shortened maximum length to the second communication device by transmitting A-MPDUs having lengths less than or equal to the previous maximum length to the second communication device during the BA session.

In another embodiment, block 816 includes the first communication device adopting the different timeout parameter indicated in the MAC action frame received at block 812. In another embodiment, block 816 includes stopping transmitting data frames to the second communication device, in an embodiment.

In an embodiment, the method further comprises transmitting, by the first communication device, a further MAC action frame to the second communication device, wherein the further MAC action frame confirms that the first communication device has adopted the change in the BA session.

The method 800 was discussed in the context of the first communication device transmitting the A-MPDU at block 804, and the first communication device receiving the BA frame at block 808. In another embodiment, the first communication device receives the A-MPDU from the second communication device at block 804, and the first communication device transmits the BA frame at block 808. Then, at block 812, the first communication device receives the MAC action frame that includes the indication of the change in the BA session, and the first communication device adopts the change at block 816.

In some embodiments, a communication device notifies other communication devices of its capability to generate and process MAC action frames such as described above (e.g., the UPDBA request frame 500 or another suitable MAC action frame). For example, a field within a capabilities information element (IE) is set to indicate that the communication device is capable of generating and processing MAC action frames such as described above, and the communication device transmits the capabilities IE to one or more other communication devices, such as during a WLAN association procedure, a WLAN reassociation procedure, etc. For example, the IEEE 802.11 Standard defines an extended capabilities IE having an extended capabilities field that is used to indication the capabilities of a WLAN communication device. The IEEE 802.11 Standard defines the extended capabilities field to include several reserved bits. In an embodiment, one or more the reserved bits in the extended capabilities field are used to indicate that a communication device is capable of generating and processing BA frames such as described above. The AP is configured to transmit the extended capabilities IE in a beacon frame, according to an embodiment The AP is configured to transmit the extended capabilities IE in an association response frame, a reassociation response frame etc., according to some embodiments. The client station is configured to transmit the extended capabilities IE an association request frame, a reassociation request frame etc., according to some embodiments.

In other embodiments, a field within another suitable IE, frame, etc., is set to indicate that the communication device is capable of generating and processing MAC action frames such as described above, and the communication device transmits the IE, frame, etc., to one or more other communication devices, such as during a WLAN association procedure, a WLAN reassociation procedure, etc. For example, a field within a vendor specific IE is set to indicate that the communication device is capable of generating and processing BA frames such as described above, according to an illustrative embodiment.

Embodiment 1: A method, comprising: generating, at a first communication device, a media access control (MAC) frame that includes an indication of a change in a block acknowledgment (BA) session that was previously established between the first communication device and a second communication device; and transmitting, by the first communication device, the MAC frame to the second communication device, wherein the MAC frame is configured to cause the second communication device to adopt the change in the BA session in response to receiving the MAC frame.

Embodiment 1A:The method of Embodiment 1, further comprising: adopting, at the first communication device, the change in the BA session.

Embodiment 2: The method of either of Embodiments 1 or 1A, wherein generating the MAC frame includes generating a field, in the MAC frame, that includes the indication of the change in the BA session.

Embodiment 3: The method of any of Embodiments 1-2, wherein the indication of the change includes an indication that transmission of aggregate MAC protocol data units (A-MPDUs) should be stopped.

Embodiment 4: The method of any of Embodiments 1-3, wherein the indication of the change includes an indication to that a maximum length of aggregate MAC protocol data units (A-MPDUs) permitted to be transmitted during the BA session should be shortened.

Embodiment 5: The method of Embodiment 4, wherein the indication that the maximum length of A-MPDUs should be shortened includes an indication of a fraction with respect to a previous maximum length of A-MPDUs.

Embodiment 6: The method of any of Embodiments 1-5, wherein indication of the change includes an indication of an updated inactivity timeout parameter value.

Embodiment 7: The method of any of Embodiments 1-6, further comprising, prior to transmitting the MAC frame that includes the indication of the change in the BA session: receiving, at the first communication device, an aggregate MAC protocol data unit (A-MPDU) from the second communication device as part of the BA session, wherein the A-MPDU includes multiple MAC protocol data units (MPDUs); generating, at the first communication device, a BA frame that includes acknowledgment information regarding the multiple MPDUs; and transmitting, by the first communication device, the BA frame to the second communication device in response to receiving the A-MPDU.

Embodiment 8: The method of any of Embodiments 1-7, further comprising, prior to transmitting the MAC frame that includes the indication of the change in the BA session: receiving, at the first communication device, a request frame from the second communication device, wherein the request frame corresponds to a request, by the second communication device, to participate in the BA session with the first communication device; generating, at the first communication device, a response frame that corresponds to a response, by the first communication device, to the request by the second communication device to participate in the BA session with the first communication device; and transmitting, by the first communication device, the response frame to the second communication device in response to receiving the request frame.

Embodiment 8A: The method of any of Embodiments 1-8, further comprising: generating, at the first communication device, an information element (IE) that includes an indication that the first communication device is capable of generating MAC frames configured to indicate changes in BA sessions; and at least one of: i) transmitting, by the first communication device, the IE in a beacon frame, and ii) transmitting, by the first communication device, the IE in a packet to the second communication device, as part of an association procedure.

Embodiment 8B: The method of any of Embodiments 1-8 and 8A, further comprising: receiving, at the first communication device, an information element (IE) from the second communication device that includes an indication that the second communication device is capable of generating MAC frames configured to indicate changes in BA sessions, wherein the IE is received at the first communication device within a beacon frame or as part of an association procedure.

Embodiment 9: An apparatus, comprising: a network interface device associated with a first communication device, wherein the network interface device includes one or more integrated circuit (IC) devices configured to: generate a media access control (MAC) frame that includes an indication of a change in a block acknowledgment (BA) session that was previously established between the first communication device and a second communication device, and transmit the MAC frame to the second communication device, wherein the MAC frame is configured to cause the second communication device to adopt the change in the BA session in response to receiving the MAC frame.

Embodiment 9A: The apparatus of Embodiment 9, wherein the one or more IC devices are configured to: adopt the change in the BA session.

Embodiment 10: The apparatus of either of Embodiments 9 or 9A, wherein the one or more IC devices are configured to: generate a field, in the MAC frame, that includes the indication of the change in the BA session.

Embodiment 11: The apparatus of any of Embodiments 9-10, wherein the indication of the change includes an indication to that transmission of aggregate MAC protocol data units (A-MPDUs) should be stopped.

Embodiment 12: The apparatus of any of Embodiments 9-11, wherein the indication of the change includes an indication that a maximum length of aggregate MAC protocol data units (A-MPDUs) permitted to be transmitted during the BA session should be shortened.

Embodiment 13: The apparatus of Embodiment 12, wherein the indication that the maximum length of A-MPDUs permitted to be transmitted includes an indication of a fraction with respect to a previous maximum length of A-MPDUs.

Embodiment 14: The apparatus of any of Embodiments 9-13, wherein the one or more IC devices are configured to generate the MAC frame to further include an indication of an updated inactivity timeout parameter value.

Embodiment 15: The apparatus of any of Embodiments 9-14, wherein the one or more IC devices are configured to, prior to transmitting the MAC frame that includes the indication of the change in the BA session: receive an aggregate MAC protocol data unit (A-MPDU) from the second communication device as part of the BA session, wherein the A-MPDU includes multiple MAC protocol data units (MPDUs); generate a BA frame that includes acknowledgment information regarding the multiple MPDUs; and transmit the BA frame to the second communication device in response to receiving the A-MPDU.

Embodiment 16: The apparatus of any of Embodiments 9-15, wherein the one or more IC devices are configured to, prior to transmitting the MAC frame that includes the indication of the change in the BA session: request a request frame from the second communication device, wherein the request frame corresponds to a request, by the second communication device, to participate in the BA session with the first communication device; generate a response frame that corresponds to a response, by the first communication device, to the request by the second communication device to participate in the BA session with the first communication device; and transmit the response frame to the second communication device in response to receiving the request frame.

Embodiment 16A: The apparatus of any of Embodiments 9-16, wherein the one or more IC devices are configured to: generate an information element (IE) that includes an indication that the first communication device is capable of generating MAC frames configured to indicate changes in BA sessions; and at least one of: i) transmit the IE in a beacon frame, and ii) transmit the IE in a packet to the second communication device, as part of an association procedure.

Embodiment 16B: The apparatus of any of Embodiments 9-16 and 16A, wherein the one or more IC devices are configured to: receive, from the second communication device, an information element (IE) that includes an indication that the second communication device is capable of generating MAC frames configured to indicate changes in BA sessions, wherein the IE is received within a beacon frame or as part of an association procedure.

Embodiment 17: A method, comprising: after an aggregate media access control (MAC) protocol data unit (A-MPDU) has been transmitted during a block acknowledgment (BA) session between a first communication device and a second communication device, and after a BA frame has been transmitted during the BA session, wherein the BA frame includes acknowledgement information regarding one or more of the MAC frames included in the A-MPDU, receiving, at the first communication device, a MAC frame from the second communication device, wherein the MAC frame includes an indication of a change in the BA session; and in response to receiving the MAC frame, adopting, at the first communication device, the change in the BA session.

Embodiment 18: The method of Embodiment 17, further comprising: transmitting, by the first communication device, the A-MPDU to the second communication device during the BA session; and receiving, at the first communication device, the BA frame from the second communication device.

Embodiment 19: The method of either of Embodiments 17 or 18, wherein the indication of the change in the BA session is included in a field of the MAC frame.

Embodiment 20: The method of any of Embodiments 17-19, wherein: the indication of the change includes an indication to stop transmitting A-MPDUs to the second communication device; adopting the change in the BA session includes stopping transmitting A-MPDUs to the second communication device during the BA session; and the method further comprises: after stopping transmitting A-MPDUs to the second communication device during the BA session in response to receiving the BA frame, resuming transmitting, by the first communication device, A-MPDUs to the second communication device during the BA session.

Embodiment 21: The method of any of Embodiments 17-20, wherein: the indication of the change includes an indication to shorten a maximum length of A-MPDUs to be transmitted to the second communication device during the BA session; adopting the change in the BA session includes transmitting only A-MPDUs having a duration less than or equal to the shortened maximum length to the second communication device during the BA session; and the method further comprises: after transmitting only A-MPDUs having a duration less than or equal to the shortened maximum length to the second communication device during the BA session, resuming transmitting, by the first communication device, A-MPDUs having lengths greater than the shortened maximum length to the second communication device during the BA session.

Embodiment 22: The method of Embodiment 21, wherein: the indication to shorten the maximum length of A-MPDUs includes an indication of a fraction with respect to a previous maximum length of A-MPDUs; and resuming transmitting A-MPDUs having lengths greater than the shortened maximum length to the second communication device during the BA session comprises transmitting A-MPDUs having lengths less than or equal to the previous maximum length to the second communication device during the BA session.

Embodiment 23: The method of any of Embodiments 17-22, wherein: the BA frame includes an indication of an updated inactivity timeout parameter value; and adopting the change in the BA session includes adopting the updated inactivity timeout parameter value.

Embodiment 24: The method of any of Embodiments 17-23, further comprising, prior to receiving the MAC frame that includes the indication of the change in the BA session: generating, at the first communication device, a request frame that corresponds to a request, by the first communication device, to participate in the BA session with the second communication device; transmitting, by the first communication device, the request frame from the second communication device; and receiving, at the first communication device, a response frame from the second communication device, wherein the response frame is in response to the request frame.

Embodiment 24A: The method of any of Embodiments 17-24, further comprising: generating, at the first communication device, an information element (IE) that includes an indication that the first communication device is capable of generating MAC frames configured to indicate changes in BA sessions; and at least one of: i) transmitting, by the first communication device, the IE in a beacon frame, and ii) transmitting, by the first communication device, the IE in a packet to the second communication device, as part of an association procedure.

Embodiment 24B: The method of any of Embodiments 17-24 and 24A, further comprising: receiving, at the first communication device, an information element (IE) from the second communication device that includes an indication that the second communication device is capable of generating MAC frames configured to indicate changes in BA sessions, wherein the IE is received at the first communication device within a beacon frame or as part of an association procedure.

Embodiment 25: An apparatus, comprising: a network interface device associated with a first communication device, wherein the network interface device includes one or more integrated circuits(IC) devices configured to: after an aggregate media access control (MAC) protocol data unit (A-MPDU) has been transmitted during a block acknowledgment (BA) session between the first communication device and a second communication device, and after a BA frame has been transmitted during the BA session, wherein the BA frame includes acknowledgement information regarding one or more of the MAC frames included in the A-MPDU, receive a MAC frame from the second communication device, wherein the MAC frame includes an indication of a change in the BA session, and in response to receiving the MAC frame, adopt the change in the BA session.

Embodiment 26: The apparatus of Embodiment 25, the one or more IC devices are configured to: transmit the A-MPDU to the second communication device during the BA session; and receive the BA frame from the second communication device.

Embodiment 27: The apparatus of either of Embodiments 25 or 26, wherein the indication of the change in the BA session is included in a field of the BA frame.

Embodiment 28: The apparatus of any of Embodiments 25-27, wherein: the indication of the change includes an indication to stop transmitting A-MPDUs to the second communication device; and the one or more IC devices are configured to: in response to receiving the MAC frame, stop transmitting A-MPDUs to the second communication device during the BA session, and after stopping transmitting A-MPDUs to the second communication device during the BA session, resume transmitting A-MPDUs to the second communication device during the BA session.

Embodiment 29: The apparatus of any of Embodiments 25-28, wherein: the indication of the change includes an indication to shorten a maximum length of A-MPDUs to be transmitted to the second communication device during the BA session; and the one or more IC devices are configured to: in response to receiving the MAC frame, transmit only A-MPDUs having a duration less than or equal to the shortened maximum length to the second communication device during the BA session; and after transmitting only A-MPDUs having a duration less than or equal to the shortened maximum length to the second communication device during the BA session, resume transmitting A-MP- DUs having lengths greater than the shortened maximum length to the second communication device during the BA session.

Embodiment 30: The apparatus of any of Embodiments 25-29, wherein: the indication to shorten the maximum length of A-MPDUs includes an indication of a fraction with respect to a previous maximum length of A-MPDUs; and the one or more IC devices are configured to transmit A-MPDUs having lengths less than or equal to the previous maximum length to the second communication device during the BA session.

Embodiment 31: The apparatus of any of Embodiments 25-27, wherein: the BA frame includes an indication of an updated inactivity timeout parameter value; and the one or more IC devices are configured to adopt the updated inactivity timeout parameter value in response to receiving the MAC frame.

Embodiment 32: The apparatus of any of Embodiments 25-31, wherein the one or more IC devices are configured to, prior to receiving the MAC frame that includes the indication of the change in the BA session: generate a request frame that corresponds to a request, by the first communication device, to participate in the BA session with the second communication device; transmit the request frame from the second communication device; and receive a response frame from the second communication device, wherein the response frame is in response to the request frame.

Embodiment 32A: The apparatus of any of Embodiments 25-32, wherein the one or more IC devices are configured to: generate an information element (IE) that includes an indication that the first communication device is capable of generating MAC frames configured to indicate changes in BA sessions; and at least one of: i) transmit the IE in a beacon frame, and ii) transmit the IE in a packet to the second communication device, as part of an association procedure.

Embodiment 32B: The apparatus of any of Embodiments 25-32 and 31A, wherein the one or more IC devices are configured to: receive, from the second communication device, an information element (IE) that includes an indication that the second communication device is capable of generating MAC frames configured to indicate changes in BA sessions, wherein the IE is received within a beacon frame or as part of an association procedure.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   generating, at a first communication device, a media access control (MAC) frame that includes i) an indication of a change in a block acknowledgment (BA) session that was previously established between the first communication device and a second communication device, and ii) at least one of a) an updated number of buffers parameter indicating a reduced number of buffers available for the BA session and b) an updated inactivity timeout parameter value associated with the BA session;
   transmitting, by the first communication device, the MAC frame to the second communication device, wherein the MAC frame is configured to cause the second communication device to adopt the change in the BA session in response to receiving the MAC frame; and
   adopting, at the first communication device, the change in the BA session.

2. The method of claim 1, wherein generating the MAC frame includes generating a field, in the MAC frame, that includes the indication of the change in the BA session.

3. The method of claim 1, wherein:
   generating the MAC frame comprises generating MAC frame to include the updated number of buffers parameter set to a value that prompts stoppage of transmission of aggregate MAC protocol data units (A-MPDUs) during the BA session.

4. The method of claim 1, wherein:
   generating the MAC frame comprises generating the MAC frame to include the updated number of buffers parameter set to a value that prompts a reduction of a maximum length of aggregate MAC protocol data units (A-MPDUs) permitted to be transmitted during the BA session.

5. The method of claim 1, further comprising, prior to transmitting the MAC frame that includes the indication of the change in the BA session:
   receiving, at the first communication device, an aggregate MAC protocol data unit (A-MPDU) from the second communication device as part of the BA session, wherein the A-MPDU includes multiple MAC protocol data units (MPDUs);
   generating, at the first communication device, a BA frame that includes acknowledgment information regarding the multiple MPDUs; and
   transmitting, by the first communication device, the BA frame to the second communication device in response to receiving the A-MPDU.

6. The method of claim 1, further comprising, prior to transmitting the MAC frame that includes the indication of the change in the BA session:
   receiving, at the first communication device, a request frame from the second communication device, wherein the request frame corresponds to a request, by the second communication device, to participate in the BA session with the first communication device;
   generating, at the first communication device, a response frame that corresponds to a response, by the first communication device, to the request by the second communication device to participate in the BA session with the first communication device; and transmitting, by the first communication device, the response frame to the second communication device in response to receiving the request frame.

7. The method of claim 1, further comprising:
generating, at the first communication device, an information element (IE) that includes an indication that the first communication device is capable of generating MAC frames configured to prompt adoption of changes in BA sessions without ending the BA sessions; and
at least one of:
   i) transmitting, by the first communication device, the IE in a beacon frame, and
   ii) transmitting, by the first communication device, the IE in a packet to the second communication device, as part of an association procedure.

8. The method of claim 1, further comprising:
receiving, at the first communication device, an information element (IE) from the second communication device that includes an indication that the second communication device is capable of generating MAC frames configured to prompt adoption of changes in BA sessions without ending the BA sessions, wherein the IE is received at the first communication device within a beacon frame or as part of an association procedure.

9. An apparatus, comprising:
a network interface device associated with a first communication device, wherein the network interface device includes one or more integrated circuit (IC) devices configured to:
   generate a media access control (MAC) frame that includes i) an indication of a change in a block acknowledgment (BA) session that was previously established between the first communication device and a second communication device, and ii) at least one of a) an updated number of buffers parameter indicating a reduced number of buffers available for the BA session and b) an updated inactivity timeout parameter value associated with the BA session,
   transmit the MAC frame to the second communication device, wherein the MAC frame is configured to cause the second communication device to adopt the change in the BA session in response to receiving the MAC frame, and
   adopt the change in the BA session.

10. The apparatus of claim 9, wherein the one or more IC devices are configured to:
generate a field, in the MAC frame, that includes the indication of the change in the BA session.

11. The apparatus of claim 9, wherein the one or more IC devices are further configured to:
generate MAC frame to include the updated number of buffers parameter set to a value that prompts stoppage of transmission of aggregate MAC protocol data units (A-MPDUs) during the BA session.

12. The apparatus of claim 9, wherein the one or more IC devices are further configured to:
generate MAC frame to include the updated number of buffers parameter set to a value that prompts a reduction of a maximum length of aggregate MAC protocol data units (A-MPDUs) permitted to be transmitted during the BA session.

13. The apparatus of claim 9, wherein the one or more IC devices are configured to, prior to transmitting the MAC frame that includes the indication of the change in the BA session:
receive an aggregate MAC protocol data unit (A-MPDU) from the second communication device as part of the BA session, wherein the A-MPDU includes multiple MAC protocol data units (MPDUs);
generate a BA frame that includes acknowledgment information regarding the multiple MPDUs; and
transmit the BA frame to the second communication device in response to receiving the A-MPDU.

14. The apparatus of claim 9, wherein the one or more IC devices are configured to, prior to transmitting the MAC frame that includes the indication of the change in the BA session:
receive a request frame from the second communication device, wherein the request frame corresponds to a request, by the second communication device, to participate in the BA session with the first communication device;
generate a response frame that corresponds to a response, by the first communication device, to the request by the second communication device to participate in the BA session with the first communication device; and
transmit the response frame to the second communication device in response to receiving the request frame.

15. The apparatus of claim 9, wherein the one or more IC devices are configured to:
generate an information element (IE) that includes an indication that the first communication device is capable of generating MAC frames configured to prompt adoption of changes in BA sessions without ending the BA sessions; and
at least one of:
   i) transmit the IE in a beacon frame, and
   ii) transmit the IE in a packet to the second communication device, as part of an association procedure.

16. The apparatus of claim 9, wherein the one or more IC devices are configured to:
receive, from the second communication device, an information element (IE) that includes an indication that the second communication device is capable of generating MAC frames configured to prompt adoption of changes in BA sessions without ending the BA sessions, wherein the IE is received within a beacon frame or as part of an association procedure.

* * * * *